(12) United States Patent
Amamori

(10) Patent No.: US 6,394,485 B1
(45) Date of Patent: May 28, 2002

(54) AIRBAG DEVICE AND CASING THEREOF

(75) Inventor: Ichiro Amamori, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/633,840

(22) Filed: Aug. 7, 2000

(30) Foreign Application Priority Data

Aug. 19, 1999 (JP) .......... 11-232919
Apr. 12, 2000 (JP) .......... 2000-111103

(51) Int. Cl.[7] .......... B60R 21/16
(52) U.S. Cl. .......... 280/728.2; 280/728.3; 280/732
(58) Field of Search .......... 280/728.2, 728.3, 280/732

(56) References Cited

U.S. PATENT DOCUMENTS

| 5,482,313 A | | 1/1996 | Ikeya et al. |
|---|---|---|---|
| 5,527,063 A | * | 6/1996 | Garner et al. |
| 5,588,669 A | * | 12/1996 | Leonard et al. |
| 5,735,542 A | * | 4/1998 | Bohn |
| 5,851,023 A | * | 12/1998 | Nagata et al. |
| 5,887,891 A | * | 3/1999 | Taquchi et al. |
| 6,010,146 A | * | 1/2000 | Otsuka et al. |

FOREIGN PATENT DOCUMENTS

EP  0 790 151  8/1997

* cited by examiner

Primary Examiner—Brian L. Johnson
(74) Attorney, Agent, or Firm—Kanesaka & Takeuchi (57) ABSTRACT

A passenger airbag device is formed of a casing, an airbag, a lid, thick plates for connecting the lid to the casing, and an inflator. The thick plates are fixed to inner surfaces of side walls of the casing by spot welding. Hooks formed integrally with the thick plates project outside of the casing through holes formed in the side walls of the casing. The lid is secured to the casing by engagement between holes of the lid and the hooks. In the airbag device, the thick plates can be easily fixed to the casing to provide large reinforcement effect to the casing.

8 Claims, 8 Drawing Sheets

AIRBAG DEVICE AND CASING THEREOF

BACKGROUND OF THE INVENTION AND RELATED ART STATEMENT

The present invention relates to an airbag device, and more particularly, to an airbag device which can be suitably applied to an airbag device for a front passenger's seat (hereinafter, referred to as "passenger airbag device") which is installed in an instrument panel of a vehicle. More particularly, the present invention relates to an airbag device in which a casing is provided with plate members, such as thick plates, fixed thereto and a lid engaging the plate members. The present invention also relates to a casing used for this airbag device.

One of known passenger airbag devices is a passenger airbag device in which thick plates are attached to a casing, and a lid is engaged with the thick plates by hooks of the thick plates.

Figure 7:
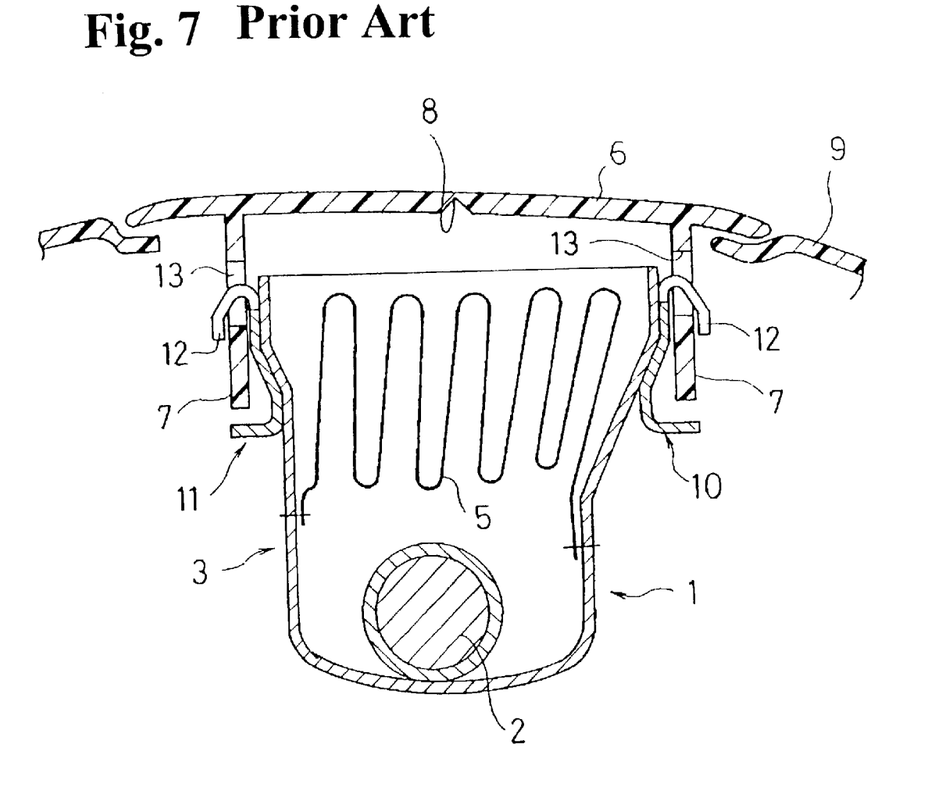
FIG. 7 is a sectional view of a conventional airbag device.

FIG. 7 is a sectional view showing a conventional airbag device. This airbag device 1 comprises an inflator 2 for generating gas in the event of a vehicle collision, a casing 3 for accommodating the inflator, an airbag 5 folded and accommodated inside the casing 3, and a lid 6 for closing an upper opening of the casing 3. The airbag device 1 is installed in an instrument panel 9 of a vehicle. Fixed to upper outer surfaces of the casing 3 by spot welding are thick plates 10, 11. The thick plates 10, 11 extend along the upper edges of the casing 3. A plurality of claw-like hooks 12 is formed integrally with the thick plates 10, 11 and spaced apart from each other at suitable intervals in the longitudinal directions of the thick plates 10, 11. Legs 7 of the lid 6 are formed with holes 13, located corresponding to the hooks 12, in which the hooks 12 are fitted, respectively. The lid 6 is provided with a reduced wall portion 8 formed in the inner surface thereof.

To attach the lid 6 to the casing 3 for assembling the airbag device 1, the lid 6 is pressed in such a manner as to close the upper opening of the casing 3. Then, the legs 7 of the lid 6 are elastically deformed outwardly to pass over the hooks 12. At portions where the hooks 12 and the holes 13 are met to each other, the legs 7 return to the original configuration, whereby the hooks 12 engage the inner edges of the holes 13.

In the airbag device structured as mentioned above, as the inflator 2 is actuated, the airbag 5 is inflated and the lid 6 is torn along the reduced wall portion 8, thereby allowing the airbag 5 to deploy into the vehicle cabin.

The thick plates 10, 11 are attached to the casing 3 and the lid 6 is engaged with the hooks of the thick plates 10, 11, so that the required strength of the casing 3 can be reduced, thereby achieving the reduction in thickness and weight of the casing 3.

In the aforementioned conventional airbag device shown in FIG. 7, the spot welding is required to connect the thick plates 10, 11 to the casing 3 at a large number of points, thereby requiring a lot of works for connecting the thick plates 10, 11 to the casing 3 and increasing the manufacturing cost of the casing 3. In this case, when the number of the points to be welded is reduced, the reduction in thickness of the casing 3 can not be made because the impact load applied to the thick plates 10, 11 when the lid 6 is opened by the inflation of the airbag 5 is received by the welded portions where the number is reduced. During the inflation of the airbag 5, a force for enlarging the upper portion of the casing 3 is applied by the airbag 5. With the reduced number of the welded portions, the reinforcement effect of the thick plates 10, 11 is not enough. This is because the portions of the casing 3 corresponding to the end portions of the thick plates 10, 11 without the welded portions are largely deformed, so that the deformation of the casing 3 is increased.

The object of the present invention is to solve the aforementioned problems, and to provide an airbag device which allows easy fixing of plate members, such as thick plates, to a casing and provides large reinforcement effect for the casing by the plate members.

SUMMARY OF THE INVENTION

An airbag device of the present invention comprises a casing having an opening in the top thereof, an airbag accommodated in the casing and connected to the casing, a gas generator for supplying gas into the airbag to inflate the airbag, plate members fixed to side walls of the casing, and a lid engaging the plate members to cover the opening. At least parts of the plate members are disposed inside the side walls of the casing.

A casing of the present invention accommodates an airbag and includes plate members disposed along edges of an opening of the casing. At least parts of the plate members are disposed inside the casing.

In the present invention, it is preferable that the plate member has a thickness larger than that of the casing, or is provided with a rib to have rigidity higher than that of the casing.

According to the airbag device as mentioned above, at least parts of the plate members are disposed inside the casing, so that a pressure applied to the casing by the inflation of the airbag acts in such a direction as to press the plate members to the casing. Therefore, even with reduced number of the welded portions between the plate members and the casing, the plate members can prevent the deformation of the casing.

In this case, the plate members have hooks for engaging the lid, and the ends of the hooks project outside of the casing through holes formed in the casing, respectively. Thus, stress applied to the thick plates is transmitted not only to the welded portions between the thick plates and the casing but also to the casing via contacts between the upper edges of the holes and the hooks, so that the stress is widely dispersed and transmitted to the casing.

In the present invention, it is preferable that the plate members extend in the longitudinal direction of the edges of the opening. It is preferable that a plurality of the hooks is disposed to be spaced at intervals in the longitudinal direction of the plate members and the hooks are engaged with the holes formed in the lid.

According to the present invention, the height, i.e. the length in the vertical direction, of the holes at both ends in the longitudinal direction may be larger than the height of the holes arranged between the holes at both ends. By this structure, the deformation of the casing when a passenger collides with the lid is increased, thereby improving the absorption of the impact

DETAILED DESCRIPTION OF PREFERRED EMBODIMENTS

Hereinafter, embodiments of the present invention will be described with reference to the accompanying drawings.

Figure 1:
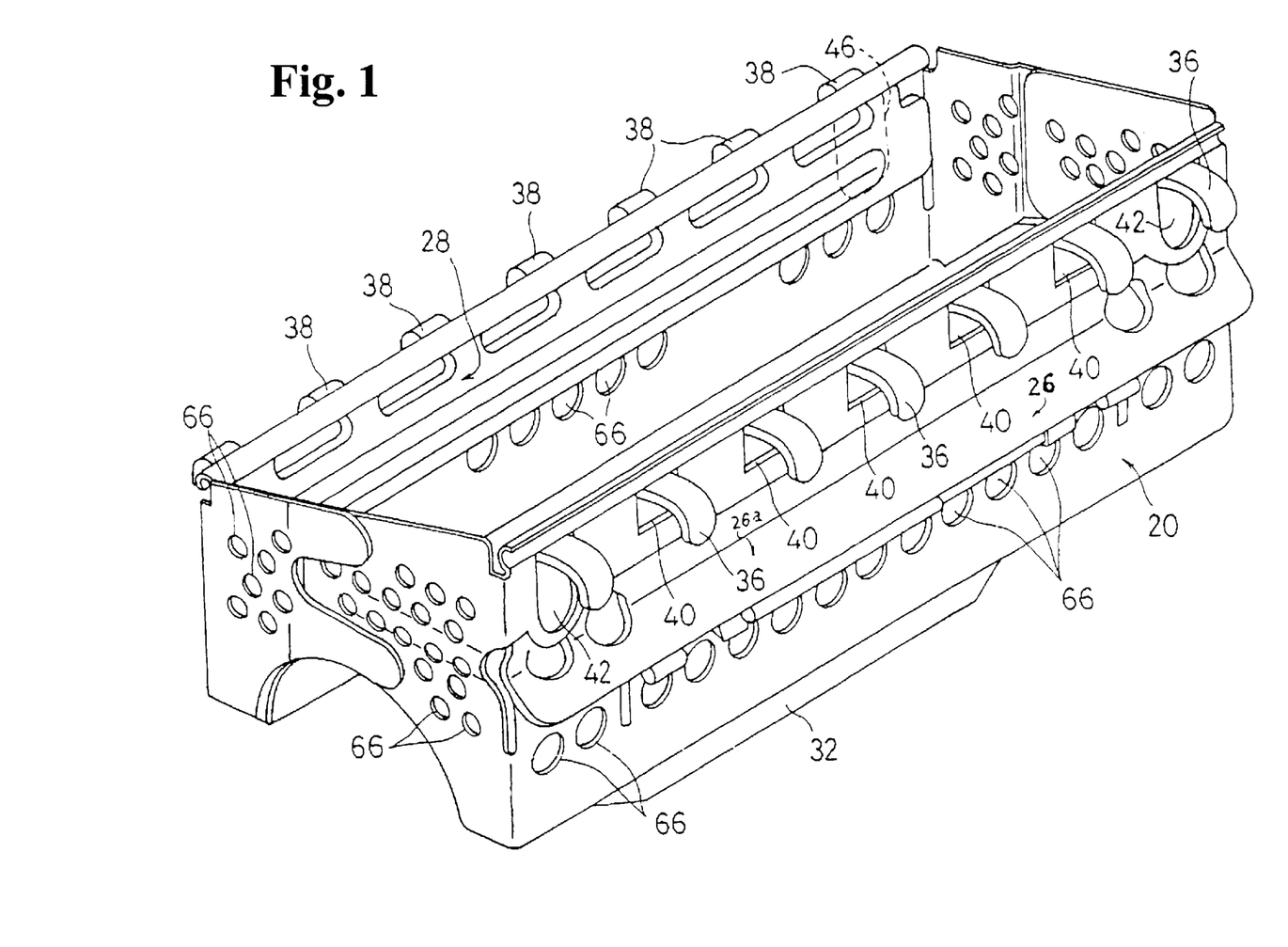
FIG. 1 is a perspective view of a casing of an airbag device according to an embodiment of the invention.
Figure 2:
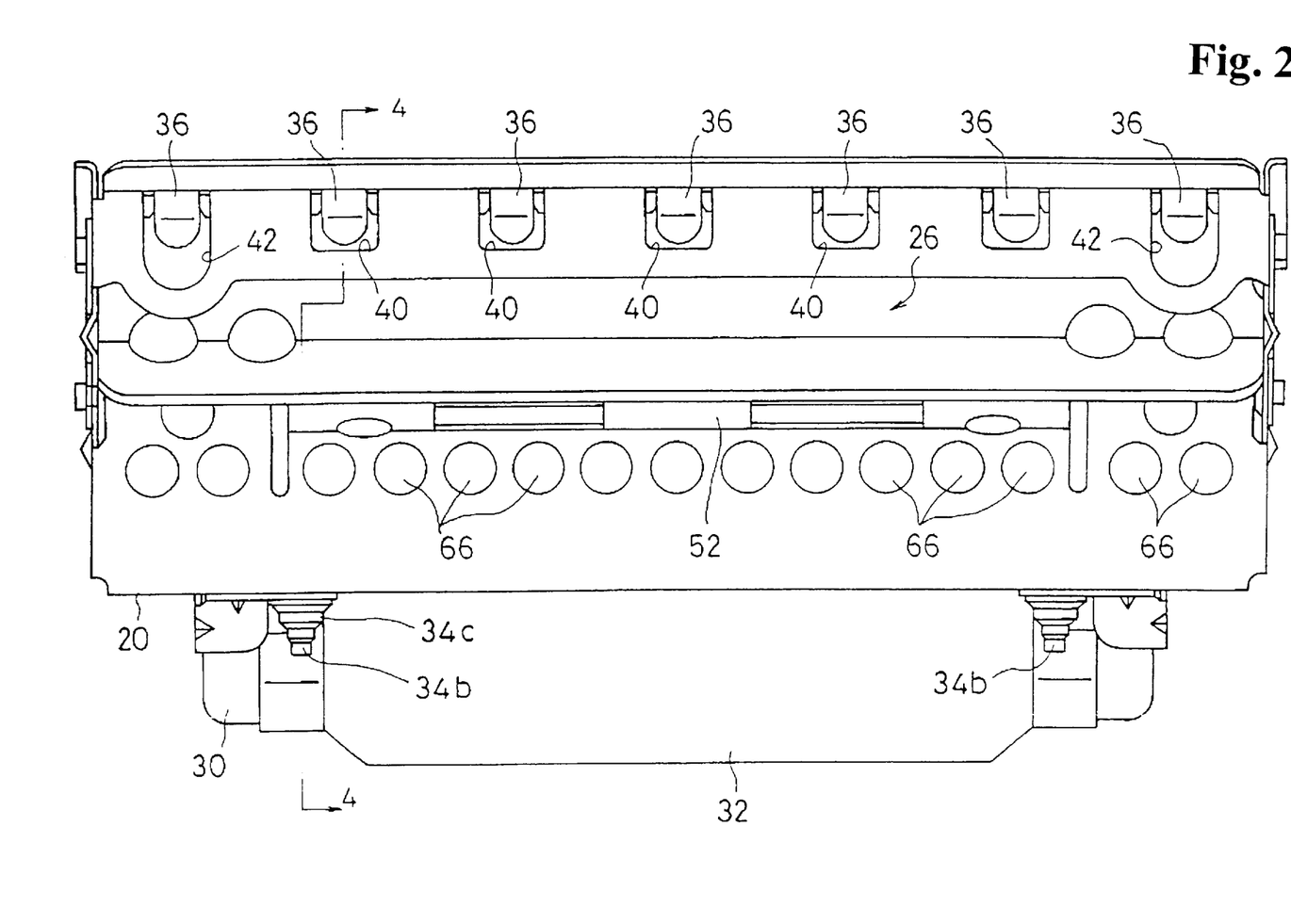
FIG. 2 is a front view of the casing of the airbag device according to the embodiment.
Figure 3:
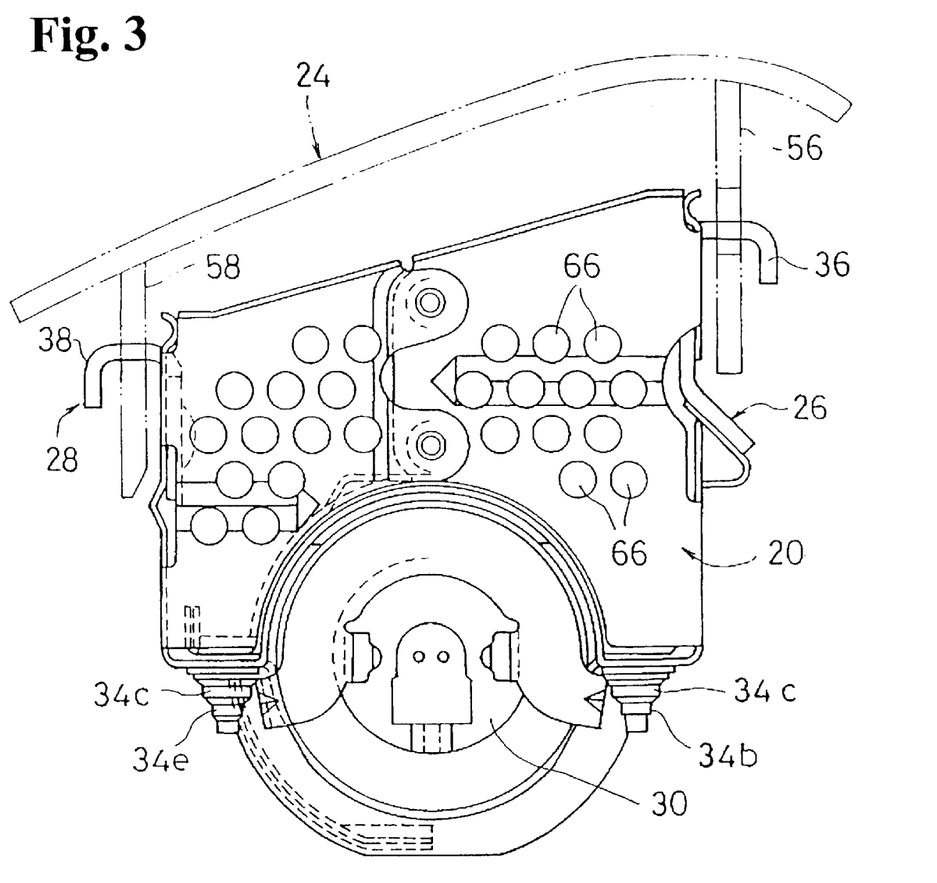
FIG. 3 is a side view of the casing of the airbag device according to the embodiment.
Figure 4:
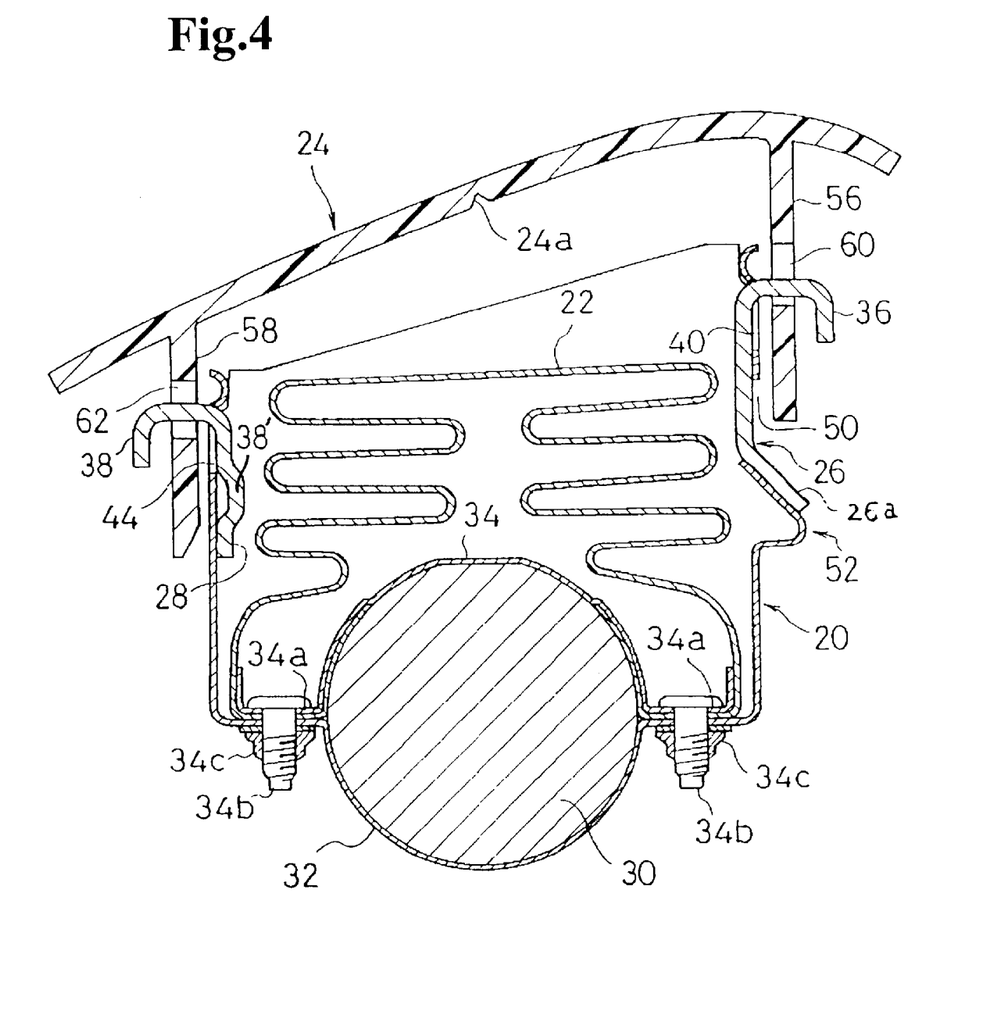
FIG. 4 is a sectional view of the airbag device taken along line 4—4 in FIG. 2.
Figure 5:
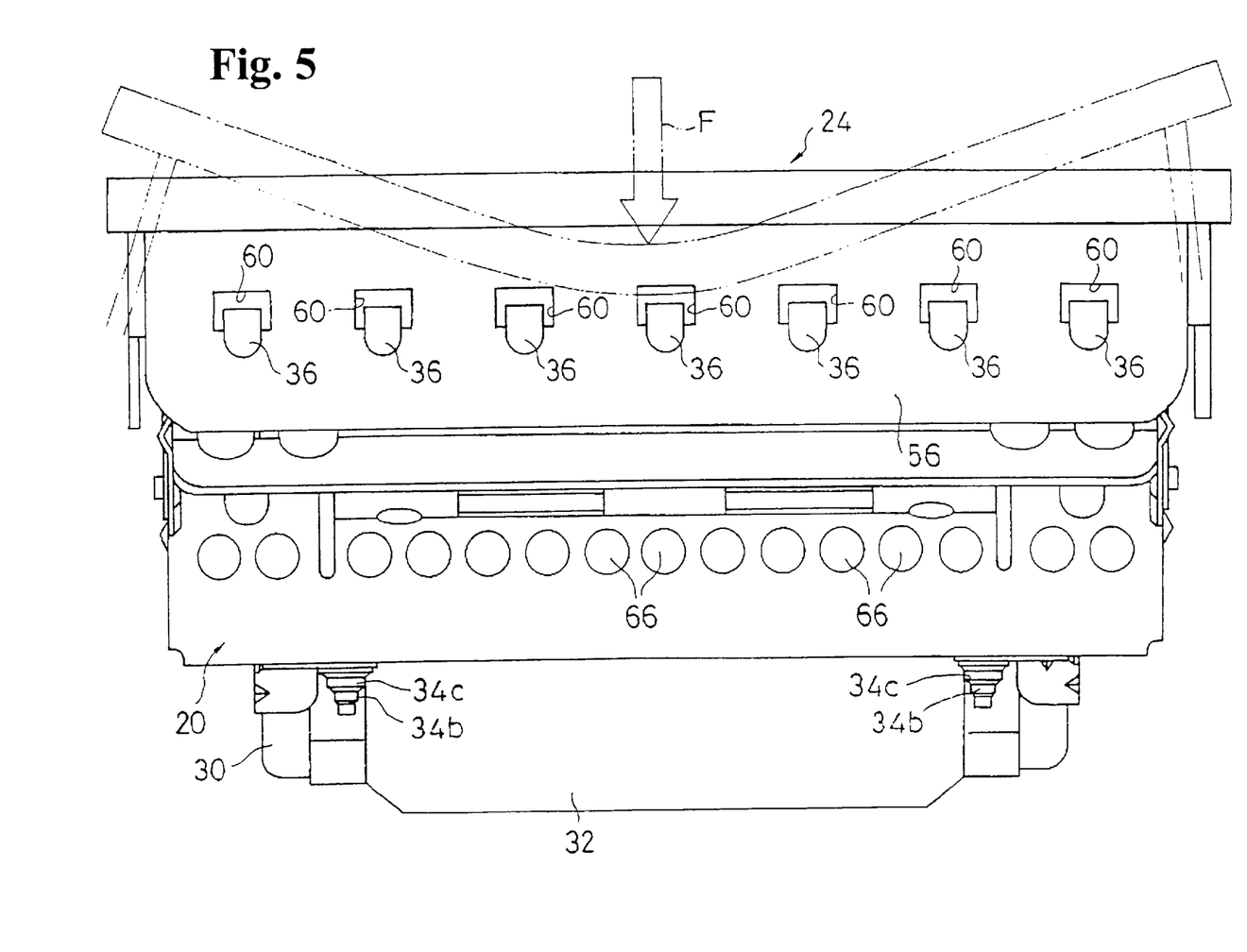
FIG. 5 is a front view of the airbag device according to the embodiment.
Figure 6:
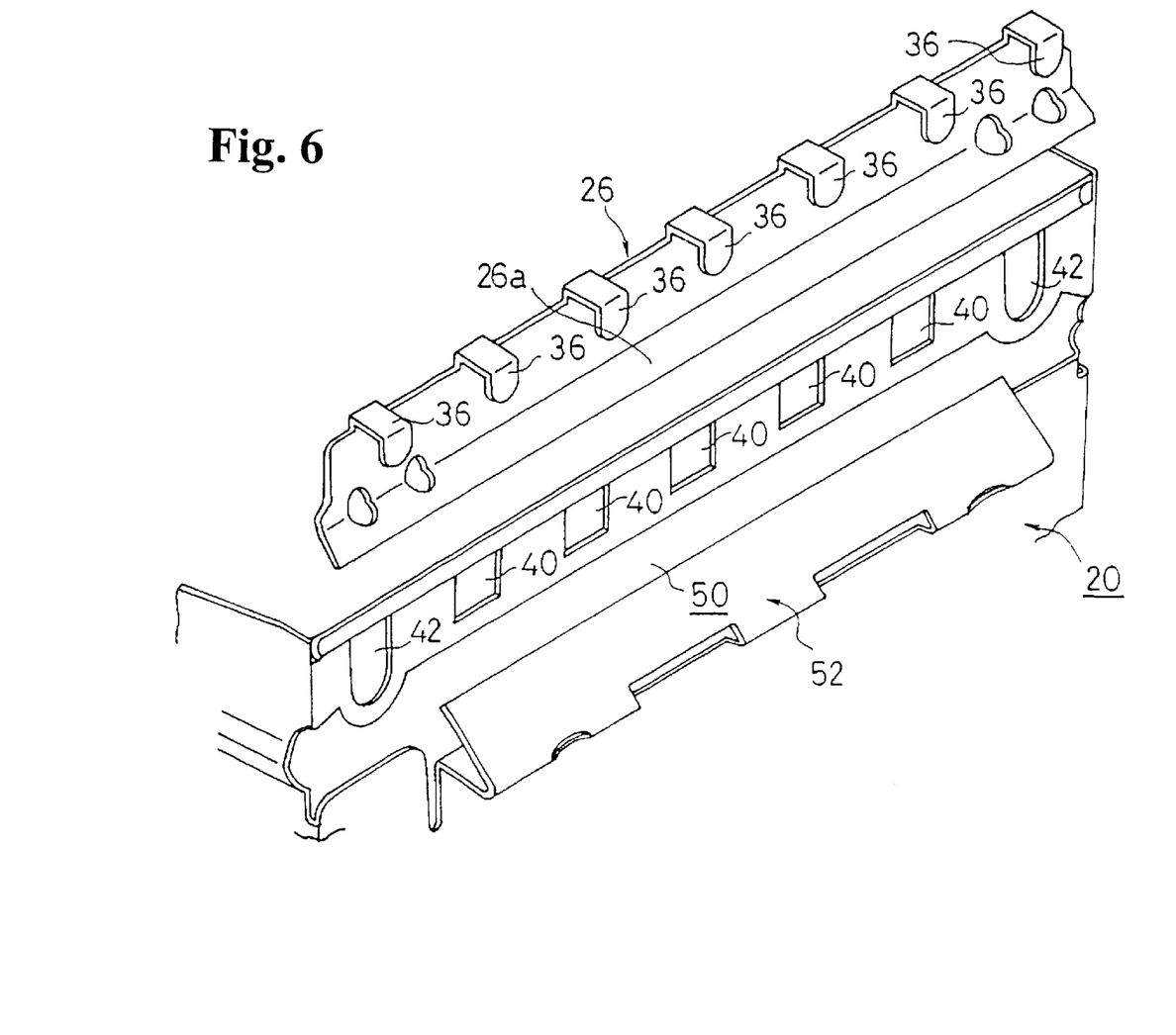
FIG. 6 is a perspective view showing the casing and thick plates of the airbag device according to the embodiment.

FIG. 1 is a perspective view of a casing according to an embodiment; FIG. 2 is a front view of the same; FIG. 3 is a side view of the same; FIG. 4 is a sectional view of an airbag device according to the embodiment taken along line 4—4 of FIG. 2; FIG. 5 is a front view of the airbag device of the embodiment; and FIG. 6 is a perspective view showing a thick plate and an upper portion of the casing.

The passenger airbag device according to this embodiment comprises a casing 20 having a rectangular shape when seen in a plan view, an airbag 22 folded and disposed in the casing 20, a lid 24 covering an opening at the top of the casing 20, thick plates 26, 28 for connecting the lid 24 to the casing 20, and a substantially circular inflator 30 for generating gas for inflating the airbag 22.

The thick plates 26, 28 are fixed to the casing 20 by spot welding. Both the casing 20 and the thick plates 26, 28 are made of steel, such as plated sheet steel. When the casing 20 and the thick plates 26, 28 are made of the same steel, the thickness of the thick plate 26 or 28 may be 1.6 times or more, e.g. from 1.6 to 3 times, larger than the thickness of the casing 20.

The casing 20 is provided with a bulge 32 formed in a half-circular shape projecting from the bottom thereof. The inflator 30 is fitted in the bulge 32 and is covered at the upper portion by a holding member 34 (FIG. 4). The holding member 34 has a flange 34a to be superposed on the bottom of the casing 20. Clamped between the flange 34a and the casing 20 is a periphery of a gas inlet of the airbag 22. The flange 34a is fixed to the casing 20 by bolts 34b and nuts 34c.

The thick plates 26, 28 extend along the upper edges of the casing 20 in the longitudinal direction. Most of the thick plates 26, 28 are disposed within the casing 20 and fixed to the casing 20 by spot welding. The number of points to be welded by spot welding, besides welded portions between lower portion 26a of the thick plate 26 and a bent portion 52 described later, is in a range from 2 to 4 per one thick plate. For example, with three points per one thick plate, the reinforcement effect of the thick plate exhibits enough.

The thick plates 26, 28 are formed with L-like hooks 36, 38 extending outwardly from the upper edges thereof, respectively. The casing 20 has holes 40, 42, the number of which corresponds to that of the hooks 36, formed in one of the longitudinal side walls (right hand side in FIGS. 1, 3 and 4) and has holes 44, 46, the number of which corresponds to that of the hooks 38, formed in the other longitudinal side wall (left hand side in FIGS. 1, 3 and 4).

The holes 40, 42 are formed to have upper edges at the same level. The holes 42 are disposed at both ends and the holes 40 are disposed between the holes 42. The length of the hole 42 in the vertical direction is longer than that of the hole 40. Through the holes 40, 42, the hooks 36 of the thick plate 26 project outside the casing 20.

The holes 44, 46 are formed to have upper edges at the same level. The holes 46 are disposed at both ends and the holes 44 are disposed between the holes 46. The length of the hole 46 in the vertical direction is longer than that of the hole 44. Through the holes 44, 46, the hooks 38 of the thick plate 28 project outside the casing 20.

The lower portion 26a of the thick plate 26 is bent at about 45°. The lower portion 26a extends through a slit 50 formed in the side wall of the casing 20 to the outside of the casing 20. The side wall of the casing 20 is provided with a bent portion 52, having a V-like section projecting outwardly, formed beneath the slit 50. The lower portion 26a is superposed on the upper surface of the bent portion 52 and welded at 2–4 points by spot welding.

The lid 24 has a pair of legs 56, 58 which are formed with holes 60, 62, respectively. By engagement of the hooks 36, 38 with the holes 60, 62, the lid 24 is secured to the casing 20.

In the airbag device structured as mentioned above, as the inflator 30 is actuated to spout out gas, the airbag 22 is inflated, and the lid 24 is torn along the reduced wall portion 24a so that the airbag 22 is deployed into the vehicle cabin. During the inflation, the airbag 22 applies pressure to the thick plates 26, 28 and the casing 20 in such a direction as to expand the casing 20. Since the thick plates 26, 28 are arranged in the casing 20, the pressure by the airbag 22 can be supported by the thick plates 26, 28, thereby preventing the expansion of the casing 20.

During the inflation, the airbag 22 also applies force for lifting the lid 24 in the upward direction in FIG. 4. The force is supported by the legs 56, 58, and the thick plates 26, 28. Since the hooks 36, 38 of the thick plates 26, 28 project through the holes 40, 42, 44, 46 to the outside of the casing 20, the lifting force applied to the thick plates 26, 28 is transmitted not only to the welded portions between the thick plates 26, 28 and the casing 20, but also to the casing 20 via contacts between the upper edges of the holes 44, 42, 44, 46 and the hooks 36, 38. Therefore, the lifting force is widely dispersed and transmitted to the casing 20, thereby preventing the deformation of the casing 20 due to the force of upward lifting.

In this embodiment, the casing 20 is formed with a large number of holes 66 to absorb the impact applied to the instrument panel (impact applied by the occupant when the occupant collides with the instrument panel). In this embodiment, the lengths of the holes 42, 46 in the vertical direction are larger than those of the holes 40, 44. This is also made for improving the absorption of the impact at the instrument panel.

That is, when the occupant in the front passenger seat plunges as shown by arrow F in FIG. 5 into the instrument panel about the middle in the lateral direction of the lid 24, the middle of the lid 24 dents in a direction of the arrow F and the side walls of the casing 20 are deformed according to the dent of the lid 24 so as to absorb the impact at the instrument panel. During this, the both end portions of the casing 20 tend to be lifted. Since the holes 42, 46 extend long downwardly as shown in FIGS. 1, 2 and 6, the end portions of the casing 20 are not subjected to the restriction by the thick plates 26, 28 when the end portions of the casing 20 are lifted. Therefore, the casing 20 is smoothly deformed so as to increase the absorption of the impact at the instrument panel.

The impact at the instrument panel is also absorbed by the deformation of the bent portion 52. Therefore, the total absorption of the impact at the instrument panel by the casing 20 is significantly great.

Figure 8:
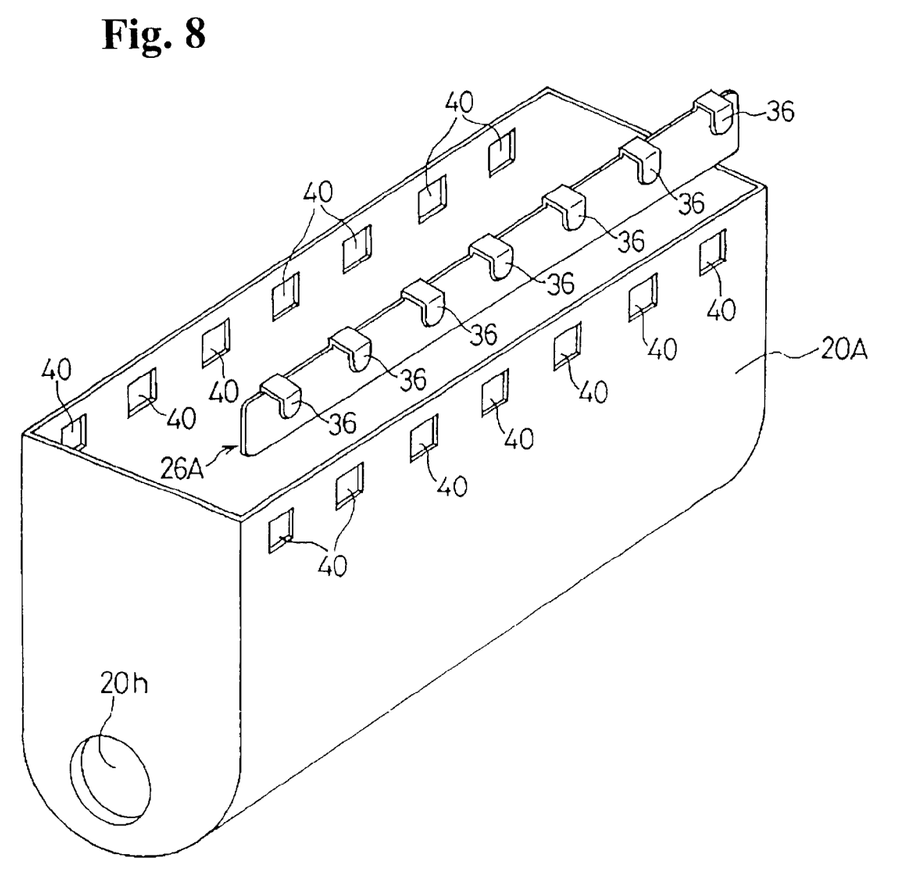
FIG. 8 is a perspective view showing a casing and a thick plate of an airbag device according to another embodiment.

In the present invention, the materials of the casing and the thick plates are not limited. For example, the casing may be made of synthetic resin and the thick plates may be made of metal. FIG. 8 is a perspective view showing such a casing 20A and a thick plate 26A of another embodiment. The casing 20A is formed with an opening 20h through which an inflator is inserted. The thickness of the casing 20A is for example from 2 mm to 4 mm and the thickness of the thick plate is for example from 2 mm to 3.2 mm. These ranges are only illustrative and the thicknesses are not limited thereto. Other numerals in FIG. 8 designate the parts by the numerals same as those shown in FIG. 6.

Though the thick plates are employed as the plate members in the aforementioned embodiments, the plate members may be provided with a rib 38', for example, having half-circular section, to have rigidity higher (the thickness is not limited) than that of the casing.

As described above, the present invention provides the airbag device in which the deformation of the casing during the inflation of the airbag is reduced. The casing of the airbag device can be easily manufactured because of the reduced number of connecting portions, e.g. spot-welded points, on the plate members.

While the invention has been explained with reference to the specific embodiments of the invention, the explanation is illustrative and the invention is limited only by the appended claims.

What is claimed is:

1. An airbag device comprising:

a casing having side walls, an opening at a top thereof, a bent portion formed in at least one of the side walls and extending along a longitudinal direction of the casing to protrude outwardly of the casing, and a plurality of holes formed in the side walls, an airbag accommodated in and connected to the casing, a gas generator for supplying gas into the airbag to inflate the airbag, plate members fixed to the side walls of the casing to extend along a longitudinal direction of edges of the opening and disposed generally inside the side walls of the casing to substantially directly receive an impact from the airbag at a time of inflation of the airbag, said plate members having a plurality of hooks projecting outside of the casing through the holes of the casing and spaced at intervals in a longitudinal direction of each of the plate members, a number of the holes corresponding to a number of the hooks, a length in a vertical direction of the holes at two ends in the longitudinal directing being greater than that of the holes between the holes at the two ends, and a lid engaging the hooks of the plate members to cover the opening.

2. An airbag device as claimed in claim 1, wherein said plate members are fixed to the casing at a plurality of connecting points.

3. An airbag device as claimed in claim 1, wherein a thickness of each of the plate members is larger than that of the casing.

4. An airbag device as claimed in claim 1, wherein at least one of the plate members is provided with a rib to have rigidity higher than that of the casing.

5. An airbag device comprising:

a casing having side walls, an opening at a top thereof, a bent portion formed in at least one of the side walls and extending along a longitudinal direction of the casing to protrude outwardly of the casing, a plurality of holes formed in the side walls, a lateral slit located above the bent portion, and an upper portion located above the lateral slit, an airbag accommodated in and connected to the casing, a gas generator for supplying gas into the airbag to inflate the airbag, plate members fixed to the side walls of the casing and disposed generally inside the side walls of the casing to substantially directly receive an impact from the airbag at a time of inflation of the airbag, one of the plate members located inside the casing extending through the lateral slit to be disposed on an outer surface of the bent portion and fixed to parts of the bent portion and the upper portion, said plate members having a plurality of hooks projecting outside of the casing through the holes of the casing, and a lid engaging the hooks of the plate members to cover the opening.

6. A casing for an airbag comprising:

a main casing for accommodating the airbag and having side walls, an opening at a top thereof, a bent portion formed in at least one of the side walls and extending along a longitudinal direction of the casing to protrude outwardly of the casing, a plurality of holes formed in the side walls, a lateral slit located above the bent portion, and an upper portion located above the lateral slit, and plate members fixed to the side walls of the casing and disposed generally inside the side walls of the casing to substantially directly receive an impact from the airbag at a time of inflation of the airbag, one of the plate members located inside the casing extending through the lateral slit to be disposed on an outer surface of the bent portion and fixed to parts of the bent portion and the upper portion, said plate members having a plurality of hooks projecting outside of the casing through the holes of the casing for engaging a lid.

7. A casing for an airbag device as claimed in claim 6, wherein a thickness of each of the plate members is greater than that of the main casing.

8. A casing for an airbag device as claimed in claim 6, wherein at least one of the plate members is provided with a rib to have rigidity higher than that of the casing.

* * * * *